United States Patent Office 3,192,198
Patented June 29, 1965

3,192,198
PENICILLINS
John Herbert Charles Nayler, Coombelea, Cliftonville, Dorking, Surrey, England, and Harry Smith, Horsielands Bungalow, Old Barn Lane, Newdigate, Surrey, England
No Drawing. Filed Oct. 31, 1963, Ser. No. 320,538
Claims priority, application Great Britain, Nov. 2, 1962, 41,541/62
3 Claims. (Cl. 260—239.1)

This invention relates to new pencillins.

In our U.S.A. Patent No. 2,985,648 we have described and claimed penicillin derivatives of the general formula:

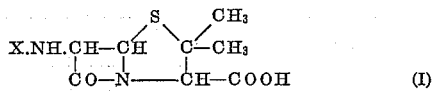
$$\text{CO—N———CH—COOH} \quad (I)$$

where X is an amino-substituted acyl group containing up to 20 carbon atoms and having the formula:

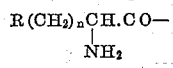

where R is hydrogen or an amino, carboxyl or substituted or unsubstituted alkyl, aryl, aralkyl or heterocyclic group and $n$ is zero or an integer, and non-toxic salts thereof. These compounds are of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria.

We have now found that certain compounds falling within the general Formula I above have particularly desirable properties especially in respect of their activity against Gram-negative bacteria.

Accordingly, the present invention provides new pencillins of the general formula:

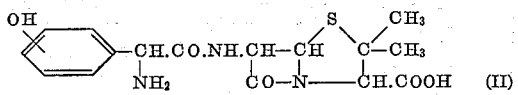

and non-toxic salts thereof.

The salts are non-toxic salts including non-toxic metallic salts such as sodium, potassium, calcium and aluminium, the ammonium salt and substituted ammonium salts, e.g. salts of such non-toxic amines as trialkylamines, including triethylamine, procaine, dibenzylamine, N-benzyl-beta-phenethylamine, 1-ephenamine, N,N¹-dibenzylethylenediamine, dehydroabietylamine, N,N¹-bis-dehydroabietylethylenediamine, and other aminos which have been used to form salts with benzylpenicillin.

The present invention also provides a process for the preparation of the penicillins of the general Formula II and non-toxic salts thereof, which process comprises reacting 6-aminopenicillanic acid or a salt thereof with a reactive derivative of a carboxylic acid of the general formula:

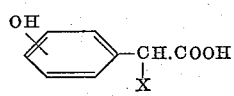

where X represents an amino group or a group that may be transformed into an amino group.

Thus the compounds of the present invention may be prepared and isolated in the manner described and claimed in our U.S.A. Patent No. 3,078,268 i.e. by catalytic hydrogenation of the N-benzyloxycarbonyl derivative.

Alternately, the compounds of the present invention may be prepared by forming an α-bromo-hydroxy-benzyl-penicillin or non-toxic salt thereof and reacting same with hexamethylenetetramine, or by forming an α-azido-hydroxybenzylpenicillin or a non-toxic salt thereof and catalytically hydrogenating same.

In certain cases it is desirable to protect the phenolic group as well as the amino group before coupling with 6-aminopenicillanic acid, both protecting groups then being removed in the final hydrogenation. Suitable O-protecting groups are benzyl and benzyloxycarbonyl.

The compounds of the present invention contain an asymmetric carbon atom in the side chain and thus can exist in two optically active isomeric forms. It is to be understood that the present invention includes both epimeric forms as well as the dl-mixture.

The following examples illustrate the invention:

EXAMPLE 1

*Sodium 6-(O,N,dibenzyloxycarbonyl-p-oxy-dl-α-aminophenylacetamido)-penicillanate*

Ethyl chlorocarbonate (2.2 ml.) was added to an ice cold solution of O,N,dibenzyloxycarbonyl-p-oxy-dl-α-aminophenylacetic acid (10 g.) and triethylamine (3.85 ml.) in dry acetone (193 ml.). The mixture was stirred at 0° C. for 5 minutes during which triethylamine hydrochloride precipitated. The suspension was cooled to −30° C. and stirred vigorously whilst adding as rapidly as possible an ice cold solution of 6-aminopenicillanic acid (5.85 g.) in 3% aqueous sodium bicarbonate (193 ml.), the temperature of the mixture never being allowed to rise above 0° C. The resulting clear solution was stirred for 30 minutes at 0° C., and then for a further 30 minutes, without external cooling, and finally extracted with diethyl ether (3 x 200 ml.) only the aqueous phase being retained. This aqueous solution was brought to pH 2 by the addition of hydrochloric acid and the 6-(O,N,dibenzyloxycarbonyl-p-oxy-dl-α-aminophenylacetamido)-penicillanic acid so liberated was extracted into diethyl ether (50 ml. and 2 portions of 30 ml.). The ether phase was washed with water (3 x 5 ml.) and the water washings were discarded. Finally, the penicillin was converted to the sodium salt by shaking the ether solution with sufficient 3% sodium bicarbonate to give a neutral aqueous phase, separating the latter and evaporating it at low pressure and temperature below 20° C. The product was finally dried over phosphorous pentoxide in vacuo to give sodium 6-(O,N, dibenzyloxycarbonyl - p - oxy - dl - α - aminophenylacetamido)-penicillanate (9.2 g.) which gave a single zone of antibiotic activity on a paper chromatogram.

EXAMPLE 2

*Sodium 6-(m-hydroxy-dl-α-benzyloxycarbonyl-aminophenylacetamido)-penicillanate*

Sodium 6 - (m - hydroxy - dl - α - benzyloxycarbonyl-aminophenylacetamido)-penicillanate (8.5 g.), which gave a single zone of antibiotic activity on a paper chromatogram, was prepared from m-hydroxy-dl-α-benzyloxycarbonylaminophenylacetic acid (10 g.), 6-aminopenicillanic acid (8.6 g.) and 3% aqueous sodium bicarbonate (280 ml.) with the use of ethylchlorocarbonate (3.15 ml.), triethylamine (5.55 ml.) and dry acetone (280 ml.) in the manner described in Example 1.

EXAMPLE 3

*Sodium 6-(o-benzyloxy-dl-α-benzyloxycarbonyl-aminophenylacetamido)-penicillanate*

Sodium 6 - (o - benzyloxy - dl - α - benzyloxycarbonyl-aminophenylacetamido)-penicillanate (8.0 g.), which gave a single zone of antibiotic activity on a paper chromatogram, was prepared from o-benzyloxy-dl-α-benzyloxycarbonylaminophenylacetic acid (10 g.), 6-aminopenicillanic acid (6.64 g.), and 3% aqueous sodium bicarbonate (215 ml.) with the use of ethylchlorocarbonate (2.44 ml.), triethylamine (4.3 ml.) and dry acetone (215 ml.) in the manner described in Example 1.

EXAMPLE 4

*6-(p-hydroxy-dl-α-aminophenylacetamido) penicillanic acid*

A suspension of palladium on calcium carbonate (36 g. of 5%) in water (150 ml.) was shaken in an atmosphere of hydrogen at room temperature and atmospheric pressure for 1 hour. A neutral solution of sodium 6-(O,N,dibenzyloxycarbonyl - p - oxy - dl - α - aminophenylacetamido)-penicillanate (9 g.) in water (100 ml.) was then added and shaking in hydrogen was resumed for 1 hour. The suspension was then filtered and the collected catalyst was washed well with water without being allowed to suck dry between washings. The combined filtrate and washings were then brought to pH 6.5 with dilute hydrochloric acid and evaporated to dryness at reduced pressure and temperatures below 20° C. The product was finally dried over phosphorous pentoxide in vacuo to give a solid (5.4 g.) containing 6-(p - hydroxy - dl - α - aminophenylacetamido) - penicillanic acid. It gave only one zone of antibiotic activity when run on a paper chromatogram in various solvents. It had an $R_f$ value different from that given by the unreduced dibenzyloxycarbonyl intermediate.

EXAMPLE 5

*6-(m-hydroxy-dl-α-aminophenylacetamido)- penicillanic acid*

A suspension of palladium on calcium carbonate (16 g. of 5%) in water (150 ml.) was shaken in an atmosphere of hydrogen at room temperature and atmospheric pressure for 1 hour. A neutral solution of sodium 6-(m - hydroxy - dl - α - benzyloxycarbonylaminophenylacetamido)-penicillanate (8 g.) in water (50 ml.) was then added and shaking in hydrogen was resumed for 1 hour.

The product (6 g.) containing 6-(m-hydroxy-dl-α-aminophenylacetamido)-penicillanic acid was isolated as in Example 4. It gave only one zone of antibiotic activity when run on a paper chromatogram in various solvents. It had an $R_f$ value different from that given by the unreduced benzyloxycarbonyl intermediate.

EXAMPLE 6

*6-(o-hydroxy-dl-α-aminophenylacetamido) penicillanic acid*

A suspension of palladium on calcium carbonate (30 g. of 5%) in water (150 ml.) was shaken in an atmosphere of hydrogen at room temperature and atmospheric pressure for 1 hour. A neutral solution of sodium 6-(o - benzyloxy - dl - α - benzyloxycarbonylaminophenylacetamido)-penicillanate (7.5 g.) in water (50 ml.) was then added and shaking in hydrogen was resumed for 1 hour.

The product (6 g.) containing 6-(o-hydroxy-dl-α-aminophenylacetamido)-penicillanic acid was isolated as in Example 4. It gave only one zone of antibiotic activity when run on a paper chromatogram in various solvents. It had an $R_f$ value different from that given by the unreduced benzyloxy-benzyloxycarbonyl intermediate.

The following table illustrates the relative activity in vivo of two of the compounds of the present invention as compared with 6[D(-)α-aminophenylacetamido]-penicillanic acid (A) when tested against two Gram-negative micro-organisms in mice (a) orally and (b) subcutaneously.

| Compound | $OD_{50}$ (mg./kg.) | | | |
|---|---|---|---|---|
| | Salmonella typhimurium | | Klebsiella pneumoniae | |
| | (a) | (b) | (a) | (b) |
| A | 8.0 | 13.0 | 13.0 | 19.0 |
| Example 4 | 6.8 | 5.6 | 8.6 | 18.0 |
| Example 5 | 4.6 | 5.6 | 8.0 | 13.0 |

We claim:
1. 6 - (p - hydroxy - α - aminophenylacetamido) - penicillanic acid.
2. 6 - (m - hydroxy - α - aminophenylacetamido)-penicillanic acid.
3. A member selected from the group consisting of 6-(p - hydroxy - α - aminophenylacetamido)penicillanic acid and 6-(m-hydroxy-α-aminophenylacetamido)penicillanic acid and their sodium, potassium, calcium, aluminium and ammonium salts and their non-toxic substituted ammonium salts with amines selected from the group consisting of tri(lower)-alkylamines, procaine, dibenzylamine, N - benzyl - beta - phenethylamine, 1-ephenamine, N,N' - dibenzylethylenediamine, dehydroabietylamine, N,N'-bis-dehydroabietylethylenediamine and N-(lower)-alkylpiperidines.

References Cited by the Examiner
UNITED STATES PATENTS

| | | | |
|---|---|---|---|
| 2,985,648 | 5/61 | Doyle et al. | 260—239.1 |
| 3,040,032 | 6/62 | Doyle et al. | 260—239.1 |
| 3,071,575 | 1/63 | Doyle et al. | 260—239.1 |
| 3,071,576 | 1/63 | Doyle et al. | 260—239.1 |

NICHOLAS S. RIZZO, *Primary Examiner.*